US011006302B2

(12) United States Patent
Faronius et al.

(10) Patent No.: US 11,006,302 B2
(45) Date of Patent: *May 11, 2021

(54) METHOD, SYSTEM AND DEVICE FOR DETECTING A SILENCE PERIOD STATUS IN A USER EQUIPMENT

(71) Applicant: Telefonaktiebolaget LM Ericsson (publ), Stockholm (SE)

(72) Inventors: Carola Faronius, Järfälla (SE); Saad Naveed Ahmed, Solna (SE); Don Corry, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/787,422

(22) Filed: Feb. 11, 2020

(65) Prior Publication Data
US 2020/0178100 A1    Jun. 4, 2020

Related U.S. Application Data

(63) Continuation of application No. 16/033,414, filed on Jul. 12, 2018, now Pat. No. 10,602,387, which is a
(Continued)

(51) Int. Cl.
*H04W 24/08*    (2009.01)
*H04L 29/06*    (2006.01)
(Continued)

(52) U.S. Cl.
CPC ............ *H04W 24/08* (2013.01); *H04L 43/16* (2013.01); *H04L 65/1059* (2013.01);
(Continued)

(58) Field of Classification Search
CPC ..... G10L 25/78; H04L 43/16; H04L 65/1059; H04L 65/1083; H04M 7/006;
(Continued)

(56) References Cited

U.S. PATENT DOCUMENTS 7,231,348 B1    6/2007    Gao et al.
7,346,502 B2    3/2008    Gao et al.
(Continued)

FOREIGN PATENT DOCUMENTS

CN    101742697 A    6/2010
EP    2007084 A1    12/2008
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.1.0, Mar. 2014, pp. 1-57.

(Continued)

*Primary Examiner* — Asad M Nawaz
*Assistant Examiner* — Thomas R Cairns
(74) *Attorney, Agent, or Firm* — Murphy, Bilak & Homiller, PLLC

(57) ABSTRACT

A second device that is in communication with a first device receives transmissions of the first device and detects a SILENCE period status of the first device, which corresponds to a status wherein the first device has no speech samples to be transmitted towards the second apparatus. The second device determines the type of the received transmissions, counts the number of received transmissions of a first type, and times a time interval between the last received transmission of the first type and the last received transmission of a second determined type. At reception of a transmission of the first type, the second device detects whether the first device is in the SILENCE period status on an evaluation of the counted number of transmissions of the first type and the time interval of the last received transmis-
(Continued)

sion of the first type and the last received transmission of the second type.

8 Claims, 6 Drawing Sheets

Related U.S. Application Data continuation of application No. 14/414,762, filed as application No. PCT/EP2014/059415 on May 8, 2014, now Pat. No. 10,129,779.

(51) Int. Cl.
    *H04L 12/26*     (2006.01)
    *H04M 7/00*     (2006.01)
    *H04W 72/04*     (2009.01)
    *H04W 72/14*     (2009.01)
    *G10L 25/78*     (2013.01)
    *H04W 88/02*     (2009.01)
    *H04W 88/08*     (2009.01)

(52) U.S. Cl.
    CPC ........ *H04L 65/1083* (2013.01); *H04M 7/006* (2013.01); *H04W 72/0413* (2013.01); *H04W 72/14* (2013.01); *G10L 25/78* (2013.01); *H04W 88/02* (2013.01); *H04W 88/08* (2013.01)

(58) Field of Classification Search
    CPC . H04W 24/08; H04W 72/0413; H04W 72/14; H04W 88/02; H04W 88/08
    See application file for complete search history.

(56) References Cited

U.S. PATENT DOCUMENTS

| | | | |
|---|---|---|---|
| 8,331,299 B2 | 12/2012 | Kim et al. | |
| 8,374,126 B2 | 2/2013 | Kitaji et al. | |
| 8,417,224 B1 | 4/2013 | Young | |
| 8,509,108 B2 | 8/2013 | Koo | |
| 8,830,915 B2 * | 9/2014 | Chun | ............... H04W 72/1289 370/329 |
| 8,908,578 B2 | 12/2014 | Cho et al. | |
| 9,100,479 B2 | 8/2015 | Bouzid et al. | |
| 9,178,667 B2 | 11/2015 | Hsu | |
| 2009/0233613 A1 | 9/2009 | Furuta et al. | |
| 2011/0306309 A1 | 12/2011 | Yabe et al. | |
| 2011/0317638 A1 | 12/2011 | Cho et al. | |

FOREIGN PATENT DOCUMENTS

| | | |
|---|---|---|
| RU | 2158446 C2 | 10/2000 |
| WO | 9702561 A1 | 1/1997 |
| WO | 2009026738 A1 | 3/2009 |

OTHER PUBLICATIONS

Unknown, Author, "3rd Generation Partnership Project; Technical Specification Group Services and System Aspects; Mandatory speech codec speech processing functions Adaptive Multi-Rate (AMR) speech codec; Source controlled rate operation (Release 11)", 3GPP TS 26.093 V11.0.0, Sep. 2012, pp. 1-28.

* cited by examiner

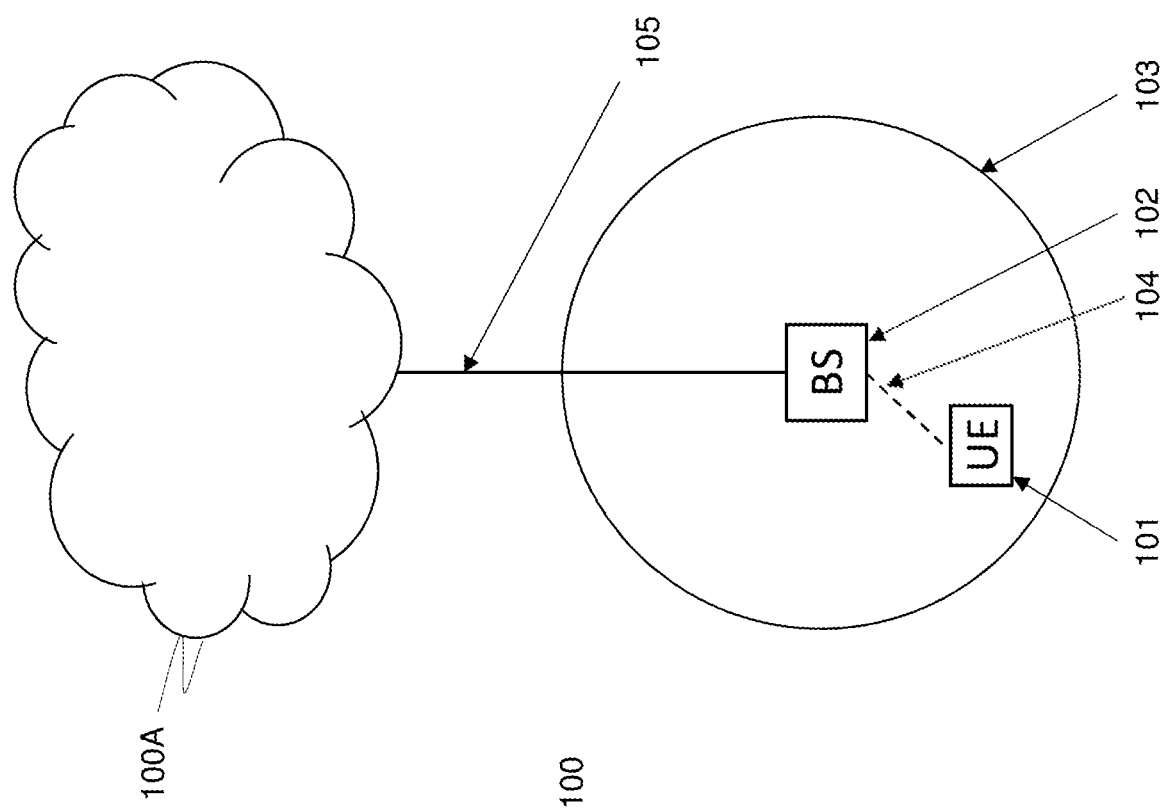

METHOD, SYSTEM AND DEVICE FOR DETECTING A SILENCE PERIOD STATUS IN A USER EQUIPMENT

RELATED APPLICATIONS

This application is a continuation of U.S. application Ser. No. 16/033,414 filed 12 Jul. 2018, which is a continuation of U.S. application Ser. No. 14/414,762 filed 14 Jan. 2015, which issued as U.S. Pat. No. 10,129,779 and is a U.S. National Phase Application of PCT/EP2014/059415 filed 8 May 2014. The entire contents of each aforementioned application is incorporated herein by reference.

TECHNICAL FIELD

The present invention relates generally to a method, system and device to enable detection of a SILENCE period status in a User Equipment, operating in an alternative TALK-SILENCE period status.

BACKGROUND

In a typical cellular network, also referred to as a wireless communication system, User Equipments (UEs), communicate via a Radio Access Network (RAN) to one or more core networks (CNs).

A UE is a mobile terminal by which a subscriber can access services offered by an operator's core network. The UEs may be for example communication devices such as mobile telephones, cellular telephones, laptops or tablet computers, sometimes referred to as surf plates, with wireless capability. The user UEs may be portable, pocket-storable, hand-held, computer-comprised, or vehicle-mounted mobile devices, enabled to communicate voice and/or data, via the radio access network, with another entity, such as another mobile station or a server.

UEs are enabled to communicate wirelessly in the cellular network. The communication may be performed e.g. between two USs, between a UE and a regular telephone and/or between the UE and a server via the radio access network and possibly one or more CNs, comprised within the cellular network.

The cellular network covers a geographical area which is divided into cell areas. Each cell area is served by a Base Station (BS), or Radio Base Station (RBS), which sometimes may be referred to as e.g. "evolved NodeB", "eNB", "eNodeB", "NodeB", "B node", or BTS (Base Transceiver Station), depending on the technology and terminology used.

The BSs may be of different classes such as e.g. macro eNodeB, home eNodeB or pico BS, based on transmission power and thereby also on cell size.

A cell is the geographical area where radio coverage is provided by the BS at a BS site. One BS, situated on the BS site, may serve one or several cells. Further, each BS may support one or several communication technologies. The BSs communicate over the air interface operating on radio frequencies with the user equipments within range of the BSs.

In some radio access networks, several BSs may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural BSs connected thereto. GSM is an abbreviation for Global System for Mobile Communications (originally: Groupe Spécial Mobile).

In 3rd Generation Partnership Project (3GPP) Long Term Evolution (LTE), BS which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for UEs. The 3GPP has undertaken to evolve further the UTRAN and GSM based radio access network technologies.

In the context of this disclosure, a base station or radio base station as described above will be referred to as a Base Station, BS. A User Equipment as described above will in this disclosure be referred to as user equipment or a UE.

The reference "DownLink" (DL) will be used for the transmission path from the BS to the UE. The reference "UpLink" (UL) will be used for the transmission path in the opposite direction i.e. from the UE to the BS.

Cellular communication networks evolve towards higher data rates, together with improved capacity and coverage. In 3GPP, standardization body technologies like GSM, HSPA, LTE and LTE-advanced have been and are currently developed.

Voice over LTE (VoLTE), and also other cellular technologies like GSM, is characterized by talk and silence periods, in an alternating fashion, with reference to 3GPP TS 26.093 chapter 5, and ETSI TS 126 093.

When a UE has speech samples or data to be transmitted to the other end, the speech samples or data are supplied to a buffer in the UE, and under control of the BS will be scheduled for transmission to the Access Network (AN) over the interface between the UE and the BS towards the receiving end via a CN, in a Voice over Internet Protocol (VoIP) packet.

During a talk period, referred to as the UE being in a TALK period status, Speech frames are generated every 20 ms, and provided to a UE's buffer, to be scheduled to be transmitted to the BS, in case the speech samples are generated at the UE.

During a silence period, referred to as the UE being in a SILENCE period status, Silence Descriptor (SID) frames, conveying information about the acoustic background noise are generated and provided to a UE's buffer, to be scheduled to be transmitted to the BS, in case the speech samples are generated at the UE, SID frames are generally generated every 160 ms. A SILENCE period status is also referred to as a "SID status".

With the Adaptive Multi Rate (AMR) speech codec during Source Controlled Rate (SCR) operation, as applied within the VoLTE system according to the referred 3GPP and ETSI standards, the first SID frame arrives 20 ms after the last Speech frame, followed by next SID frame (SID update frame) after 60 ms and then SID frames arriving every 160 ms. Talk can be resumed at any frame after any SID frame.

A proper detection and distinction between speech and SID frames, received by the eNodeB is important for efficient resource utilization and reducing packet delay time. For a BS scheduler that uses service aware buffer estimation to predict UL data with minimum reliance on UE buffer status report, it becomes important to make a correct decision about UE speech activity. E.g. the allocation of radio resources to one UE should be scheduled by the BS to an optimum to the other competing UEs benefits in the same Access Network (AN) system.

With service aware buffer estimation, a UE in TALK period status, the LIE is periodically given radio resources. For a UE in SILENCE period status these resources are less frequently provided to, or withdrawn for a period, the UE so that they can be more efficiently utilized for the AN system.

However, if these radio resources are withdrawn too early, such as in the case that the UE is still in TALK period status and thus has Speech frames to be transmitted, this withdraw will cause in packet delays.

On the other side if the radio resources are withdrawn too late, i.e. the UE is already considerable time in a SILENCE period status, the late withdraw results in resource wastage Generally, a resource is allocated when the BS detects that the UE is in a TALK period status, and the resource is released when the BS detects that the UE is in a SILENCE period status. Erroneous detection by the BS of a of UE's TALK period status can lead to wastage of the network resources and UE battery consumption.

Erroneous UE's TALK period status detection will cause the BS scheduler using service aware buffer estimation to predict UL-data, will keep on granting the UE if it erroneously stays in TALK period status for transmissions with Speech frames. If the UE has already switched to SILENCE period status, this will cause the UE to send empty transmissions in UL. These empty transmissions will be meaningless and result in UE battery drainage.

Erroneously detecting a UE's SILENCE period status can cause packet delays to the receiving end while the BS scheduling for UL transmissions is less frequent, thereby deteriorating voice quality.

A prior art example that presents detection of a SILENCE period status in a UE is U.S. Pat. No. 8,509,108 B2 "Apparatus and method for detecting voice period in mobile communication system".

This prior art example applies both packet size and inter-packet arrival interval to determine the UE's TALK- or SILENCE period status by Speech and SID frames received by the BS, based on an AMR codec deployed.

The prior art example determines the UE's status by comparing a maximum size of a SID frame and a minimum size of a Speech frame corresponding to determine a currently applied codec rate, and detecting the voice period by using any one of a packet size and an inter-packet interval according to the comparison result.

Problem with solutions based on packet size are e.g.:

Regarding a Voice codec rate: The voice codec has a variety of ranges, which will make the SID packet size to vary greatly. Moreover, for AMR codec, the codec rate can change during the conversation.

Regarding Robust Header Compression (RoHC): RoHC is a framework for compression of headers of Internet Protocol (IP) packets. The size of the headers of bearers carrying VoIP calls is compressed and thereby a voice call needs less bandwidth. The compressed size depends on the IP version used (IP version 4, IPv4 or IP version 6, IPv6). Hence RoHC can change the VoIP packet IP type sizes.

Regarding RTCP (Real-time Transport Control Protocol): VoIP media is carried by IP—User Datagram Protocol (UDP)—Real Time Protocol (RTP). RTP is a general purpose protocol used mainly for streaming multimedia applications. RTP is used in conjunction with the Real-time Transport Control Protocol (RTCP). While RTP carries the media streams (audio or video), RTCP monitor transmission statistics and quality of service information.

RTCP packets are different in size than RTP speech or SID frames. RTP and RTCP utilize the same Quality-of-service Class Identifier (QCI), so detection based on packet size becomes difficult.

Problem with solutions based on packet interval are e.g.:

Regarding RTCP: RTCP packets do not follow the structured inter-arrival pattern as RTP TALK/SID frames do.

Regarding Re-transmissions: Re-transmissions happen regularly on an air interface. These re-transmissions will change or at least influence the inter-arrival time between packets.

Regarding Segmentation: In addition to re-transmission, segmentation of packets will also cause delay in arrival of packets, and hence influence the interval timing.

Although reliable interval timing in a network with a fairly predictable air interface is a challenge, a system which is close to its full capacity with deteriorating radio conditions is even more a challenge to detect a UE's TALK/SILENCE period status when the BS scheduler cannot properly schedule the UE to a nominal scheme.

SUMMARY

In view of the discussion above, it is an object for embodiments herein to provide an improved and robust way of detecting a Silence period status within a User Equipment (UE), by a Base Station (BS) serving the UE in a cellular telecommunication network system.

In particular, it is an object for embodiments to increase the chances to correctly perform a detection by the BS of a UE's transfer from a TALK- to a SILENCE period status.

In an aspect of the invention a method for detecting a SILENCE period status in a User Equipment (UE), performed by a device is proposed, wherein the method is performed by a number of steps described below.

As a first step, transmissions are received whereafter the type of the received transmissions is determined.

The number of received transmissions of a first determined type is counted and a timer is initialized for a timing an interval by the reception of a transmission of a second determined type. This second type of transmissions comprises transmissions that correspond to a SILENCE period status in the UE. The first and second type of transmissions are different.

As a last step it is detected whether the UE is in the SILENCE period status by means of an evaluation of the counted number of transmissions of the first type, and a time interval between the last received transmission of the first type and the last received transmission of the second type.

In a further aspect the method is directed to a UE that comprises an alternating SILENCE- and TALK period status. The SILENCE period status corresponds to a status wherein the UE has no speech samples to be communicated, and the TALK period status corresponds to a status wherein the UE has speech samples to be communicated.

The first type of transmissions represents neither a SILENCE nor a TALK period status, and the second type of transmissions represent either a SILENCE or a TALK period status.

In a still further aspect the method proposed comprises the detecting step whether the UE is in the SILENCE period status by performing a logical AND expression of the counted number of transmissions of the first type being equal or larger than a first threshold value, AND the time interval between the last received transmission of the first type and the last received transmission of the second type, being larger or equal to a second threshold value.

In a still further aspect the method as applied on transmissions transmitted by the UE being non-Voice over Internet Protocol, non-VoIP, padding, empty or failure transmissions, regarded as transmissions of the first type. Transmission of the second type are Voice over Internet Protocol, VoIP, transmissions.

In a still further aspect the method proposes have the devise submit a grant signal, for allowing the first UE to transmit its transmissions.

In a still further aspect the method is proposed to be performed in telecommunication network system where the device is a Base Station (BS), comprised by the same telecommunication network system with the UE.

In a still further aspect it is proposed to apply the method wherein the UE in the telecommunication network system is characterised by an alternating SILENCE- and TALK period status, wherein the SILENCE period status corresponds to a status wherein the UE has no speech samples to be communicated, while the TALK period status corresponds to a status wherein the UE has speech samples to be communicated.

The first type of transmissions represents neither a SILENCE nor a TALK period status, and the second type of transmissions represent either a SILENCE or a TALK period status.

In a still further aspect it is proposed to apply the method in a Voice over Long Term Evolution, VoLTE, telecommunication network system, wherein the Base Station (BS) is an eNodeB.

In a still further aspect the method proposes to base the determination step of the received transmissions on a Logical Channel Identifier (LCID) as present in a subheader in the Media Access Control, MAC, layer. The eNodeB has allocated a specific value to the LCID corresponding to a specific Voice over Internet Protocol, VoIP, channel for the UE for VoIP traffic.

In a still further aspect the method proposes that received transmissions having no corresponding value within the Logical Channel Identifier, LCID, as a Voice over Internet Protocol, VoIP, channel are determined as non-Voice over Internet Protocol, non-VoIP, transmissions, and transmissions having a corresponding value within the LCID as a Voice over Internet Protocol, VoIP, are determined as Voice over Internet Protocol, VoIP, transmissions.

In a still further aspect the method proposed that the non-Voice over Internet Protocol, non-VoIP, padding or empty transmissions are counted by a counter and the time interval between the last received Voice over Internet Protocol, VoIP, transmission and the last received non-VoIP, transmission is timed by a timer.

In a still further aspect the method proposes that the detecting step is performed by a logical AND expression. A first part of the AND expression is of the counted number of transmissions of non-Voice over Internet Protocol, non-VoIP, type, padding or empty transmissions that are equal or higher than a first threshold value, listed as Threshold1.

A second part of the AND expression is the time interval between last received transmission of Voice over Internet Protocol, VoIP, type and the last received non-Voice over Internet Protocol type, non-VoIP, padding or empty transmission, which time interval is equal or higher than a second threshold value, listed as Threshold2.

The logical AND expression is performed on the first part AND the second part.

The eNodeB, performing the evaluation, detects that the User Equipment, UE, is in a SILENCE period status (200A) when the logical AND expression yields True.

In a still further aspect of the invention a further step of the eNodeB is proposed wherein the eNodeB submits an UpLink-Grant, UL-Grant, allowing the UE to transmit transmissions to the eNodeB.

In an aspect of the invention is system is proposed that comprises at least one Base Station, BS, serving or servicing at least one User Equipment, UE, wherein the BS is arranged to detect a SILENCE period status in the UE.

The UE is arranged to transmit transmissions of a Voice over Internet Protocol, VoIP, type transmissions, non-Voice over Internet Protocol, non-VoIP, type transmissions, padding or empty transmissions.

The VoIP transmissions sent by the UE represent a status of the UE, being either a TALK period status or a SILENCE period status. In the TALK status, the UE has speech samples to transmit, while in the SILENCE status the UE has no speech samples to transmit.

The BS is arranged to receive the transmissions and to determine the type of the transmissions received. Additionally, the BS is further arranged to count the number of non-VoIP, padding or empty transmissions, and to time a time interval between last received VoIP transmission and the last received non-VoIP, padding or empty transmission.

The BS is further arranged to evaluate and detect whether the UE is in a SILENCE period status. The BS evaluates a logical AND expression of having two parts. The first part is a check whether the counted number of non-VoIP, padding or empty transmissions being equal or higher than a first threshold value, listed as Threshold1.

The second part is a check whether a timed time interval between last received VoIP transmission and the last received non-VoIP, padding or empty transmission is equal or higher than a second threshold value, listed as Threshold2.

As an aspect of the invention a Base Station, BS, is proposed in a cellular telecommunication network system, wherein the BS is arranged to detect a SILENCE period status in a User Equipment, UE, that transmits transmissions.

The BS comprises a processing module that is arranged to process program instructions, as well as a memory module that is arranged to store the program instructions and network parameters.

The BS further comprises an interface module that is arranged to connect to other network entities and to receive the transmissions.

The BS still further comprises a determinator module that is arranged to determine the type of transmissions received.

The BS still further comprise a counter module that is arranged to count the transmissions of a first determined type, and a timer module that is arranged to time a time interval between the received transmissions of the first type and the received transmissions of a second determined type.

The BS still further comprises an evaluator and detector module that is arranged to detect whether the UE is in the SILENCE period status on an evaluation of a logical expression.

The logical expression comprises the counted number of transmissions of the first type and the time interval between the received transmissions of the first type and received transmissions of the second type.

The BS's processing module is further arranged, under the program instructions, to control the interface module, the determinator module, the counter module, and the evaluator and detector module.

In a further aspect of the BS the evaluator and detector module is arranged to evaluate a logical AND expression with two parts. The first part is the counted number of transmissions of the first type being equal or higher than a first threshold value, listed as Threshold1.

The second part is the timed interval between the received transmissions of the first type and the received transmissions of the second type being equal or higher than a second threshold value, listed as Threshold2.

The logical expression is performed on the first-AND the second part. When the result is True, the BS has detected that the UE is in a SILENCE period status.

in a still further aspect of the BS, the transmissions of the first type are non-Voice over Internet Protocol, non-VoIP, padding or empty transmissions, and the transmissions of the second type are Voice over Internet Protocol, VoIP, transmissions.

In a still further aspect of the BS, the interface module is further arranged to transmit a grant signal, UE, allowing the UE to transmit the transmissions.

In a still further aspect of the BS is an eNodeB in a telecommunication network system is a Voice over Long Term Evolution (VoLTE) telecommunication network system.

The eNodeB's interface module is further arranged to provide the determinator module with the Logical Channel Identifier, LCID, present as a subheader in the Media Access Control, MAC, layer, of the transmissions received.

In a still further aspect of the eNodeB, the transmissions of the first type are non-Voice over Internet Protocol, non-VoIP, padding or empty transmissions, and the transmissions of the second type are Voice over Internet Protocol, VoIP, transmissions.

The evaluator and detector module is arranged to evaluate the counted non-VoIP, padding or empty transmissions and to evaluate the timed interval between the VoIP transmissions and the non-VoIP, padding or empty transmissions, according to a logical expression.

In a still further aspect of the eNodeB the interface module is further arranged to transmit an UpLink-Grant, UL-Grant, signal, allowing the UE to transmit the transmissions.

In an aspect of the invention a computer program is proposed which, when being executed by a processing module in a Base Station (BS) is adapted to carry out or control a method for detecting a SILENCE period status in a User Equipment (UE).

The SILENCE period status corresponds to a status wherein the UE has no speech samples to be communicated, albeit transmitting transmissions indicating the SILENCE period status.

The BS further performs the step of determining the type of the received transmissions.

The BS still further performs the steps of counting a number of received transmissions of a first determined type, and timing a time interval between a last received transmission of the first type and a last received transmission of a second determined type.

The BS still further performs the step of detecting whether the UE is in the SILENCE period status on an evaluation of the counted number of transmissions of the first type and the time interval between the last received transmission of the first type and the last received transmission of the second type.

In a further aspect of the execution of the computer in the BS, the detecting step comprises a logical AND expression with two parts. The first part is the counted number of transmissions of the first type being equal or higher than a first threshold value, listed as Threshold1.

The second part is the timed interval between the received transmissions of the first type and the received transmissions of the second type being equal or higher than a second threshold value, listed as Threshold2.

The logical expression is performed on the first-AND the second part. When the result is True, the BS has detected that the UE is in a SILENCE period status.

in a still further aspect of the execution of the computer in the BS the transmissions of the first type are non-Voice over Internet Protocol, non-VoIP, padding or empty transmissions and the transmissions of the second type are Voice over Internet Protocol, VoIP, transmissions.

In a still further aspect of the execution of the computer in the BS the BS performs a further step of transmitting a grant signal, allowing the UE to transmit the transmissions.

In an aspect of the invention a Base Station (BS) is proposed for detecting a SILENCE period status in a User Equipment (UE) having the SILENCE period status corresponding to a status wherein the UE has no speech samples to be communicated.

The BS comprises an interface module for providing a grant signal allowing the UE to transmit a transmission, and receiving the transmission.

The BS further comprises a determinator module for determining the type of the received transmission.

The BS still further comprises a counter module for counting a number of received transmissions of a first determined type, being a non-Voice over Internet Protocol, non-VoIP, padding or empty transmission.

The BS still further comprises a timer module for timing a time interval between a last received transmission of the first type and a last received transmission of a second type, being a Voice over Internet, VoIP, type transmission.

The BS still further comprises an evaluator and detector module for detecting whether the UE is in the SILENCE period status. The evaluation is performed on the counted number of transmissions of the first type and the time interval between the last received transmission of the first type and a last received transmission of a second type, being a Voice over Internet. VoIP, type transmission.

These and other embodiments according to the present invention are now illustrated in more detail with reference to the enclosed drawings.

BRIEF DESCRIPTION OF THE DRAWINGS

FIG. 1 is a block diagram illustrating an embodiment of a system;

DETAILED DESCRIPTION

FIG. 1 is a block diagram illustrating an embodiment of a system.

FIG. 1 shows a single Base Station (BS), 102, comprised by a telecommunication network system 100. The telecommunication network system 100, further comprises a network 100A, comprising an Access Network (AN) and a Core Network (CN).

The BS 102 is linked to a control node comprised by the network 100A which might be, as an example a Base Station Controller, BSC, or a Radio Network Controller, RNC.

Although a single BS 102 is depicted, a common telecommunications network system 100, deploys multiple BSs, generally identical to BS 102.

BS 102 has a schematically illustrated service or coverage area 103, where a first device or User Equipment (UE) 101 is serviced. UE 101 communicates via link 104, via the BS 102 towards a receiving end, comprised by Access/Core network 100A.

BS 102 connects to the Access/Core network 100A via link 105 for communication of media and control information.

Figure 2A:
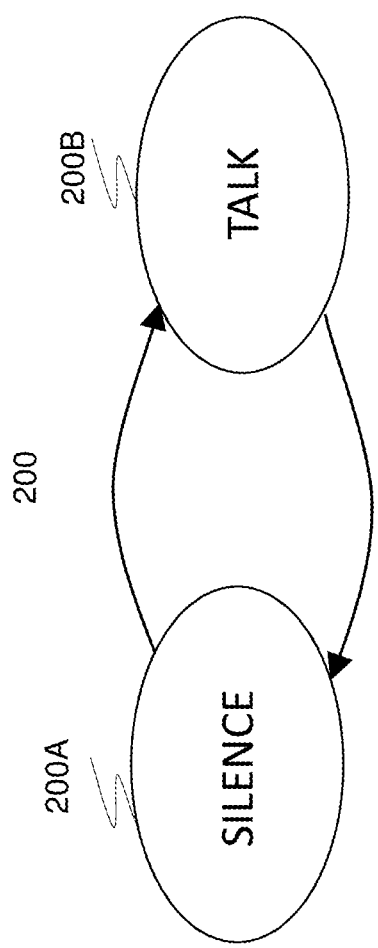
FIG. 2A is a status diagram illustrating an embodiment of method steps.

FIG. 2A is a status diagram illustrating an embodiment of method steps.

FIG. 2A shows a status, or state, diagram 200 of a UE 101, wherein two statuses are presented. A SILENCE period status 200A, next to a TALK period status 200B are shown as two possible statuses, wherein the UE resides in one or the other status. Transitions from one status to the other are depicted by arrows, illustrating that the UE 101 status alternates between both statuses.

The SILENCE period status 200A corresponds to a status wherein the UE has no speech samples to be communicated to the BS 102, and the TALK period status corresponds to a status wherein the first UE has speech samples to be communicated to the BS 102. A transfer between both statuses is regarded to be performed in an infinite small period, performed by a processor in the UE 101.

Figure 2B:
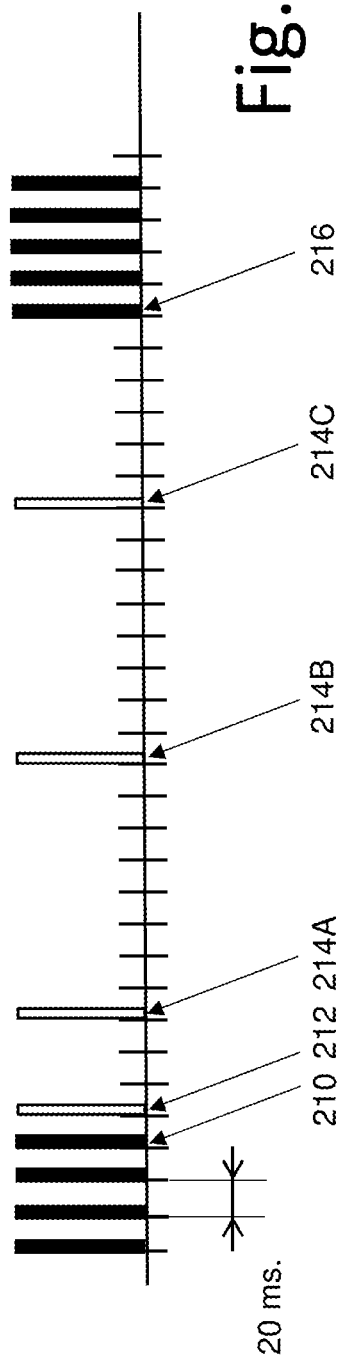
FIG. 2B is a signaling diagram illustrating an embodiment of method steps.

FIG. 2B is a signaling diagram illustrating an embodiment of method steps.

FIG. 2B presents a timeline, where time is divided in 20 ms parts, as is common in an Adaptive Multi Rate (AMR) speech codec with Source Controlled Rate (SCR) operation, as applied within a Long Term Evolution (LTE), in particular a Voice over Long Term Evolution (VoLTE) system according to the 3GPP TS 26.093 and ETSI TS 126 093 standards.

Frames 210, 216, depicted as black bars, represent Speech frames that are provided to a buffer-queue in the UE 101, to be transmitted via the interface 104 towards the BS 102.

The Speech frames 210, 216 represent a TALK period status corresponding to a status wherein the UE 101 has speech samples to be communicated to the BS 102.

Although the word speech in "Speech frame" is used along this description, any sound is to be understood as comprised by the word "speech" such as music, information tones, etc., as long as the sound is qualified to pass a determined threshold level. E.g. a speech signal recorded by an appropriate sound recording/input device in the UE 101.

Speech frames are required to be sent with high priority as to prevent delays according to an appropriate Quality-of-service Class Identifier (QCI).

Frames 212, 214A, 214B, 214C represent SID (Silence Descriptor) frames, representing a SILENCE period status corresponding to a status wherein the UE 101 has no speech samples to be communicated to the BS 102. The SID frames comprise information regarding background noise, also listed as "comfort" noise, for the receiving end.

As listed in the 3GPP TS 26.093 and ETSI TS 126 093 standards, the SID frames are submitted to the UE's buffer in a determined fashion. After a last speech frame of a speech burst (also called spurt) a hangover period of seven consecutive pause frames 210, regarded as speech frames in this description, are provided to the UEs buffer, immediately followed by a first SID frame 212, called "SID_FIRST". The pause frames may comprise short background noise spikes, taken for speech.

Subsequently after the "SID_FIRST" frame 212 at a third frame a first "SID_UPDATE" frame 214A shall be provided to the UE's buffer, followed by a second "SID_UPDATE" frame 214B at the eighth frame, and so on for subsequent SID frames 214C, as long as the UE 101 stays in SILENCE mode status 200A. At a certain moment in time the UE 101 may have new Speech frames 216 to be sent to the BS 102 and, hence, provides these speech frames to the UE's buffer for transmission.

In the remainder of this description, transmissions that contain speech or silence information (SID) are called "frames". All other transmissions are denoted as "transmissions" where appropriate.

Figure 3:
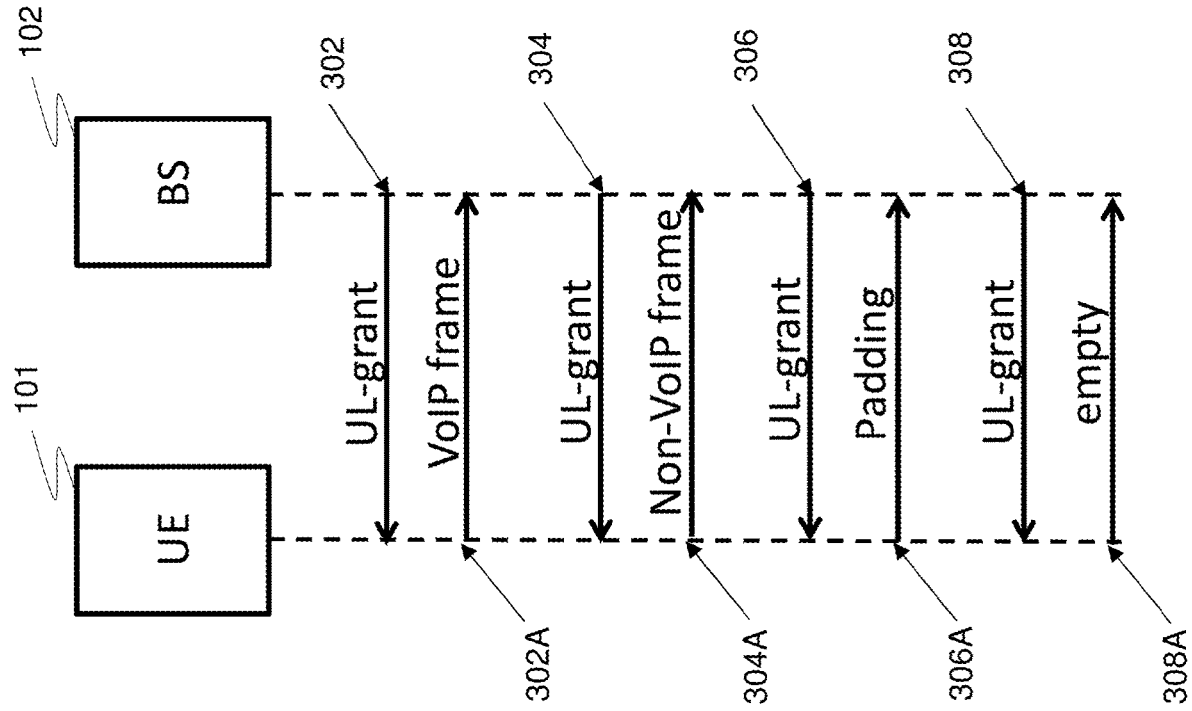
FIG. 3 is a signaling diagram illustrating an embodiment of method steps.

FIG. 3 is a signaling diagram illustrating an embodiment of method steps.

FIG. 3 depicts a number of signaling flows between the BS 102 and the UE 101. Generally, the BS 102 masters the communication between the UE 101 and the BS 102 by submitting a grant signal to the UE 101 to respond with a transmission. Systems where the UE 101 may request the BS 102 in a Scheduling Request (SR) on the Physical Uplink Control Channel (PUCCH) are not discussed here.

In the cases discussed in FIG. 3, the BS 102 grants the UE 101 to submit a transmission from its buffer by means of an UpLink Grant (UL-Grant) 302, 304, 306, 308 signaling, defined in time by the BS 102. It is up to the UE 101 what to transmit from its buffer. Due to prioritization it is expected that the UE 101 will send the frames or data in its buffer with the highest priority, such as speech, at first, when there is more data in the buffer that was received earlier than the speech sample.

A non-limiting list of frames and transmissions by the UE is exemplified below.

The UE 101 may respond with Voice over Internet Protocol (VoIP) frame 302A, indicated as a speech frame or SID frame, implemented by e.g. a Real Time Protocol (RTP) frame and/or Real-time Transport Control Protocol (RTCP) frame.

The UE 101 may respond with a non-VoIP transmission 304A, such as File Transfer Protocol (FTP) transmissions.

The UE 101 may respond with a padding transmission 306A. Padding is done in the Media Access Control (MAC) Layer to align the size of the MAC Packet Data Unit (PDU) with the Transport Block size.

It has to be remarked that if padding occurs within a VoIP frame, containing at least one part related to a frame indicated as a VoIP frame, this frame is considered to be a VoIP frame. A transmission wherein all bits are padding bits is regarded as an "empty" transmission.

If padding occurs in a non-VoIP transmission, the transmission is regarded to be non_VoIP.

It should also be remarked that the UE may compose (especially with large Transport Block Sizes, TBS) transmissions having e.g. VoIP, non-VoIP and padding in one transmission. In this case the transmission is regarded to be VoIP, as at least a part of the received transmission is VoIP related.

The UE 101 may respond with an empty transmission 308A, indicating that the UE's buffer has nothing to be communicated towards the BS 102.

Figure 4:
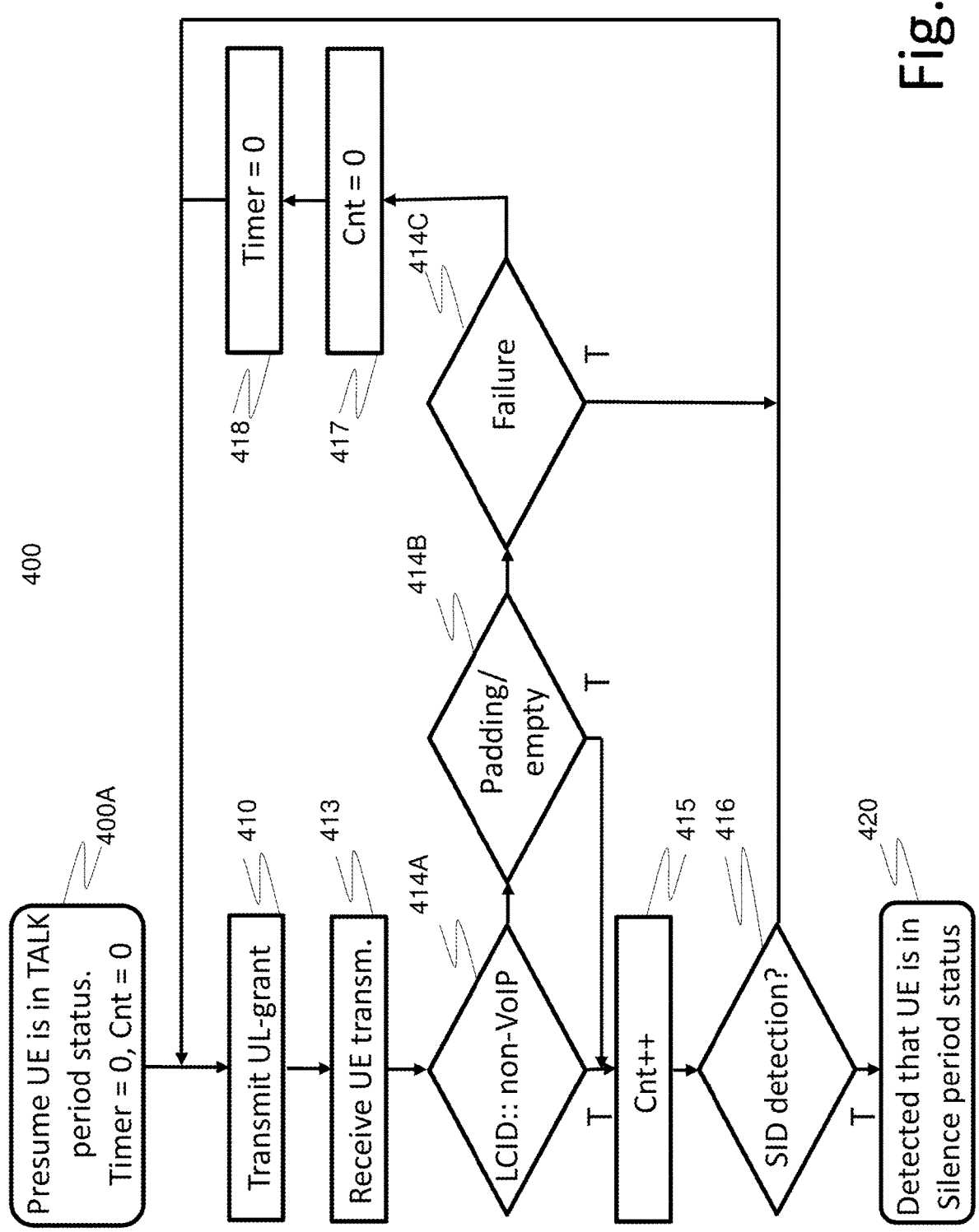
FIG. 4 is a flowchart diagram illustrating an embodiment of method steps.

FIG. 4 is a flowchart diagram illustrating an embodiment of method steps.

FIG. 4 provides a flowchart indicating a flow 400 of the method used, to have the BS 102 detect whether the UE 101 is in a SILENCE period status 200A.

"IF" statements as depicted in this figure are indicated with a "T" at the outgoing connection where the "IF" statement expression yields True. The other outgoing connection represents a False expression result.

The flow 400 initializes with the presumption 400A that the UE's period status being a TALK period status 200B, hence this flowchart is occupied with evaluating and defining whether the UE 101 is or became, with a certain reliability, into the SILENCE period status 200A.

The flow 400 presented applies a timer, denoted as "Timer" which counts preferably in ms. and is resettable to zero.

The flow 400 presented applies a counter, denoted as "Cnt" which counts in units and is resettable to zero.

As a pre-condition, on initializing flow 400, both the timer and the counter are reset to zero 400A.

As a primary step, a UL-grant signaling 410, such as signaling 302, 304, 306, 308, as explained above, is submitted to the UE 101, granting the UE 101 to respond with a transmission. The scheduling of the UL-grant is up to the BS 102, e.g. depending on the BSs processing load, radio conditions, number of other UEs to be serviced, etc.

Subsequently the transmission from the UE 101 in response to the UL-grant 410 is received 413 in a BS buffer for determination of the type of transmission.

As referred to in 3GPP TS 36.321 chapter 6.1.2., depicted in a table below, the MAC header consists of a Logical Channel ID (LCID) and a Length (L) field. The LCID indicates whether the corresponding part of the MAC payload is a MAC Control Element, and if not to which logical channel the related MAC Service Data Unit (SDU) belongs. The L field indicates the size of the related MAC SDU or MAC Control Element.

When a VoIP bearer is setup between the UE 101 and the BS 102, the bearer is assigned a specific (VoIP) LCID value, referred to as a VoIP LCID in this description. Table 6.2.1-2 shows values of LCID for UL-Shared Channel (UL-SCH). A VoIP bearer is assigned a value between (binary notation) 00001 and 01010. This LCID is used for UL transmission of VoIP frames (RTP/RTCP) by the UE 101.

Figure 6:
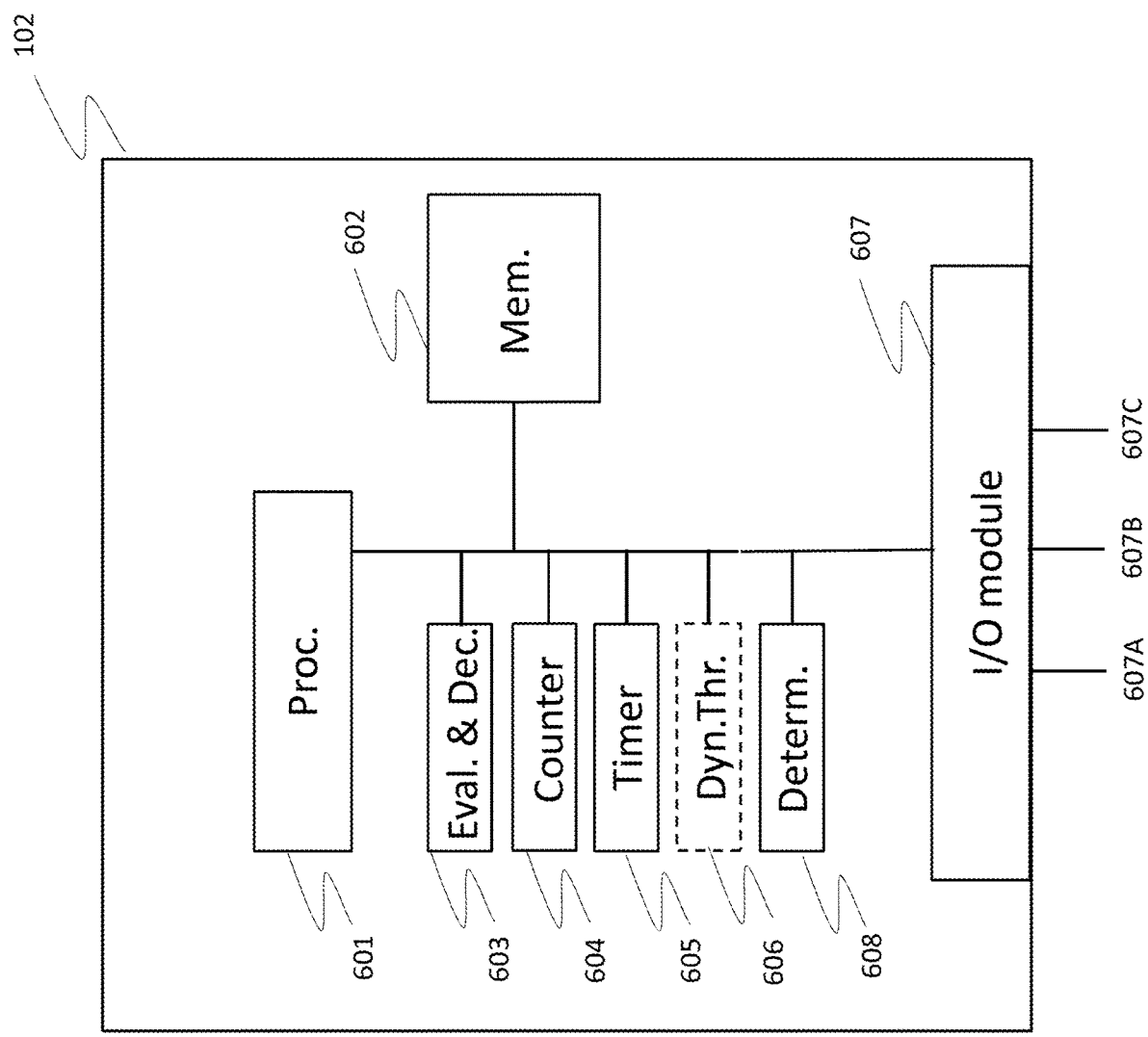
FIG. 6 is a block diagram illustrating an embodiment of a device.

The tables in 3GPP TS 36.321 FIGS. 6.1.2-1 and 6.1.2-2, show possible configurations of MAC PDU headers with LCID.

During determination 414A, 414B, 414C of the transmission received, it is checked by the BS 102, whether the LCID for the UE 101 has a value different from the value assigned for VoIP frames or traffic. If the transmission does not contain the VoIP LCID or if it is not only padding (empty), or a failure transmission, then it is as non-VoIP case, e.g. FTP, and IF statement 414A yields True.

In case IF statement 414A yields False, a next IF statement 414B is made whether the transmission is an empty- or a padding transmission. If the transmission is an empty- or a padding transmission, IF statement 414B yields True.

In case IF statement 414B yields False a next IF statement 414C is performed whether the transmission is a Non-Acknowledgement NACK or Discontinuous Transmission (DTx) and has now reached the MaxNumber of Re-transmission, i.e. a Hybrid Automatic Repeat request (HARQ) Failure transmission has occurred, denoted as "failure", IF statement 414C yields True and the procedure starts again with transmitting a next UL-grant 410.

In case however IF statement 414C yields False, i.e. the transmission received from the UE 101 is a VoIP frame, e.g. an RTP frame, the counter is reset to zero and the timer is reset to zero.

A transmission by the UE 101 that does not comprise a VoIP LCID will be a non-VoIP transmission, including empty transmissions or padding.

Once again it has to be remarked that if padding occurs within a VoIP frame, containing at least a part related to a frame indicated as a VoIP frame according to the LCID, this frame is considered to be a VoIP frame. In the latter case, a UL-grant may have requested to reply with a specific transport block Size (TBS) which cannot be filled up completely with VoIP data by the UE 101, such that the UE fills up the requested frame with padding bits.

Once again It should be remarked that the UE may compose (especially with large TBSs) transmissions having e.g. VoIP, non-VoIP and padding in one transmission. In this case the transmission is regarded to be VoIP, as at least a part of the received transmission is VoIP related.

If IF statements 414A or 414B yield True, the counter is increment 415 by one unit, and an evaluation 416 is performed.

The Counter-Value is to be regarded as the sum of non-VoIP, empty- or padding transmissions.

The Timer-Value is to be regarded as an interval between the last received VoIP frame and the last received non-VoIP, empty- or padding transmission.

The Evaluation comprises a logical AND expression;

$$\text{Counter-Value} \geq \text{Threshold1 \&\& Timer-Value} \geq \text{Threshold2}$$

If the evaluation 416, yields True, it is detected by the BS 102 that the UE 101 is in a SILENCE period status 420, 200A.

In case evaluation 416 yields False, the process proceeds with another UL grant 410.

When the flow 400 has resulted into the detection that the UE 101 is in a Silence period status 200A, the flow 400 ends.

The BS 102 will presume that UE 101 stays in the Silence period mode 200A until a speech frame is received and recognized by the BS 102. On recognition of the speech frame the flow 400 is activated again.

It should be noted that re-transmissions or HARQ transmissions do not influence the evaluation as this type of transmissions are not counted 415 and no evaluation 416 is performed, while the re-transmissions continue until a correct transport block is combined/decoded.

The method as suggested provides a way to be assured that the link is operational, by having a block counter that should have a value substantially equal to the number of UL-grants sent by the BS 102, and a timer that enables a timely detection after a proper received VoIP frame, thereby assuring that the UE 101 is in SILENCE period status.

The thresholds are adaptable to the situation, e.g. a system operating in a dense environment with fierce radio conditions requires more rigid detection threshold levels than a model example. The method as presented is suitable to be performed in an environment according to Adaptive Multi-Rate Source Controlled Rate, AMR-SCR, such as in a VoLTE environment.

Figure 5:
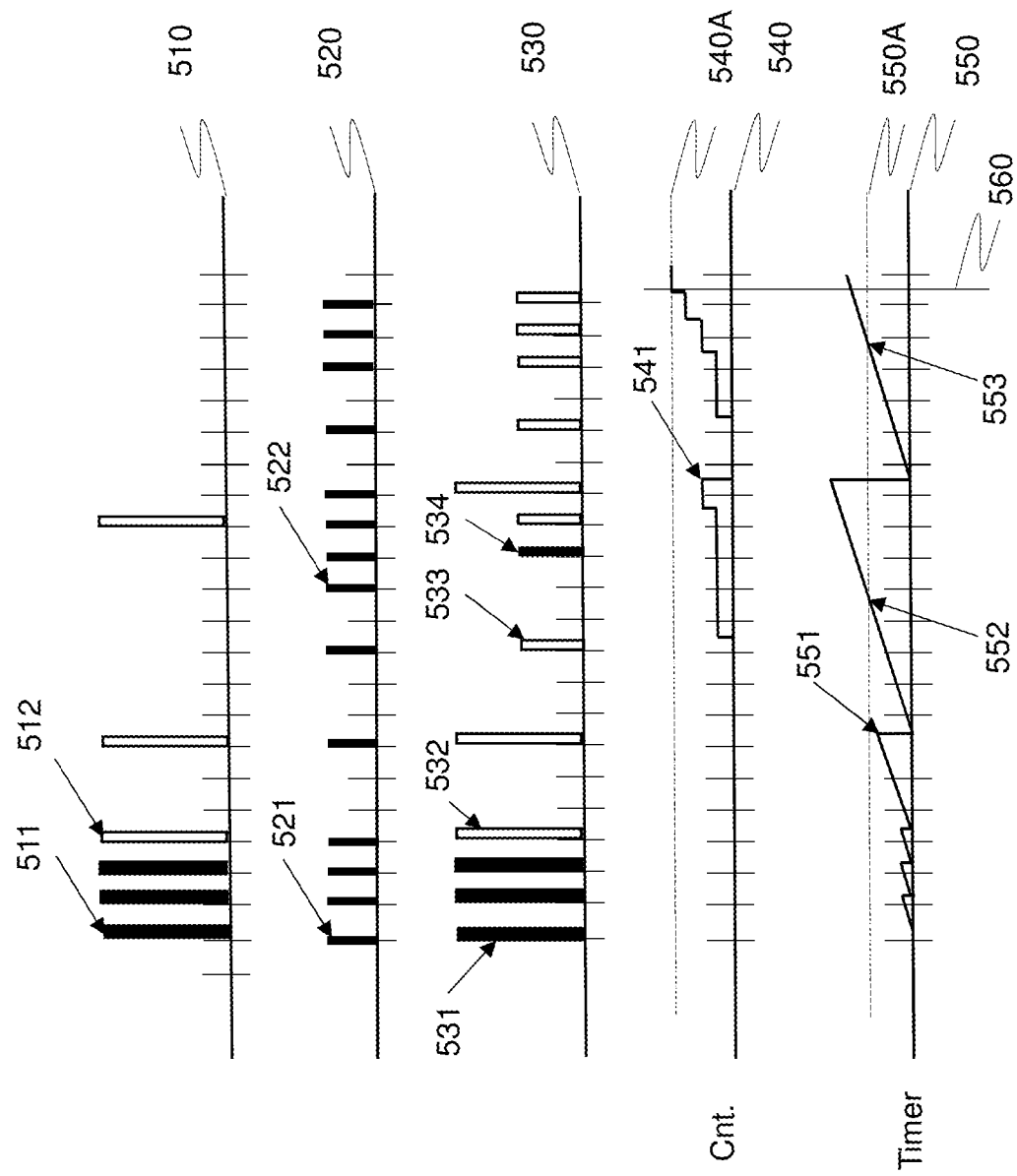
FIG. 5 is a signaling diagram illustrating an embodiment of method steps.

FIG. 5 is a signaling diagram illustrating an embodiment of method steps.

FIG. 5 depicts an arbitrary example how the method is performed in an environment where the BS 102 is loaded near full capacity, where UL-grants are not provided to the model scheme by a regular scheduling.

Timelines 510, 520, 530, 540 and 550 are all having the same time reference, occurring in parallel fashion at different places in the telecommunication network system 100 in, and between UE 101 and BS 102.

Timeline 510 shows VoIP frames provided to the UE's buffer for being transmitted to the BS 102. Frame 511 depicted as black bar is a speech frame (as well as the other equal black bars on timeline 510) and are the last speech frames in the hangover period after a speech burst/spurt. The white coloured bar (as well as the other equal white bars on timeline 510) is a SID frame with the typical 20-60-160 ms interleaving as discussed in FIG. 2B. The UE 101 is in SILENCE period status starting on the first white bar (SID) frame.

Timeline 520 shows the UL-grants submitted by the BS 102 over the air interface/link 104. Black bars 521 and 522 (as well as the other equal black bars on timeline 520) are the UL grants in an arbitrary infrequent fashion, due to the near full capacity scheduling by the BS 102. The BS 102 assumes that the UE 101 is in a TALK mode status.

Timeline 530 shows the transmissions of the UE 101 received by the BS 102 over the air interface link 104 in response to the UL-grants 521 in an illustrative way, ignoring the minor time differences between receiving the UL-grants and the UE replied transmissions.

Black bar 531 (as well as the other equal black bars on timeline 530) is the frame corresponding to the bar(s) 511.

White bar 532 (as well as the other equal white bars on timeline 530) is the SID frame corresponding to SID frame 512.

Small white bar 533 (as well as the other equal small white bars on timeline 530) is an empty (or padding) transmission in response to the UL-grant 521 as the buffer of UE 101 is empty.

Small black bar 534 is a failure or re-transmission in corresponding to UL-grant 522 that was apparently not received and not acknowledged by BS 102.

Timeline 540 represents the value of the counter. Indication 541 indicates the increments of the counter, as being incremented by statement 415.

A threshold value 540A is indicated by a dashed line, indicating the value of the Threshold1. Small white bars 533 (empty transmissions) do increment the counter, while small black bar 534 (failure or re-transmission) does Not increment the counter.

Timeline 550 represents the value of the timer. Indication 551 indicates that the counter is reset to zero on the reception of a VoIP frame (being a speech- or SID frame), as caused by statement 418. A threshold value 550A is indicated by a dashed line, indicating the value of Threshold2.

On each occurrence of a non-VoIP, or empty/padding transmission the evaluation 416 for a SID detection is performed.

As an arbitrary example regarding the threshold values, Threshold1 is set to a value of 4, and Threshold2 is set to a value of 80 ms in FIG. 5.

In FIG. 5, the timer has reached the Threshold2 level at instances indicated by references 552 and 553, although the evaluation does not yield True as the counter value is not at its Threshold1 level.

At an instance indicated by reference 560, both the timer and the counter have equated or passed their thresholds and the evaluation 416 yields True, thereby is the BS 102 detecting that the UE 101 is in a SILENCE period status FIG. 6 is a block diagram illustrating an embodiment of a device.

FIG. 6 is a block diagram illustrating an embodiment of the BS 102, arranged for detecting the SILENCE period status in the UE 101.

The UE 101 is a device that comprises an alternating SILENCE- and TALK period status, wherein the SILENCE period status corresponds to a status wherein the UE 101 has no speech samples to be communicated, to the BS 102. The TALK period status corresponds to a status wherein the UE 101 has speech samples to be communicated to the BS 102

The BS 102 comprises:
  a processing module 601 arranged to process program instructions;
  a memory module 602 arranged to store the program instructions and network parameters;
  an interface module, I/O module 607 arranged to connect to other entities.

The processing module 601 is further arranged, under the program instructions, to control the interface module 607, in that a transmissions by the UE 101 corresponding to the UE's SILENCE- or TALK period status, as well as other transmissions generated by the UE 101 are received and provided to the determinator module 608 arranged for determining the type of transmissions received.

The processing module 601 is further arranged, under the program instructions, to control the interface module 607, comprising connections 607A, 607B and 607C.

Connection 607A is arranged to be connected to a radio transceiver such that a link 104 is maintained with the one or more UEs 101 to be serviced. Signaling grants, such as the UL-grant, are transmitted via connection 607A, comprised, to be scheduled for transmission to UE 101.

Connection 607B is arranged to connect BS 102 with the Core- and Access network 100A via link 105 for communication of media and control information.

Interface module 607 optionally has a connection 607C as to have the values of thresholds Threshold1 and Threshold2 to be provided to the BS 102 during operation, other than the predetermined threshold values stored in memory module 602.

The processing module 601 is further arranged, under the program instructions, to control counter module 604, enabling the method presented by performing the counting increments 415, and the reset action 417.

The processing module 601 is further arranged, under the program instructions, to control timer module 605, enabling the method presented by performing timing increments as long as the timer module 605 is not reset to zero 418.

The processing module 601 is further arranged, under the program instructions, to control the evaluation and detection module 603 for detecting a SILENCE period status of UE 101.

The evaluation and detection module 603 performs the logical AND (&&) expression;

Counter-Value≥Threshold1 && Timer-Value≥Threshold2, wherein:
  the Counter-Value is retrieved from counter module 604;
  the Timer-Value is retrieved from timer module 605;
  Threshold1 and Threshold2 values are retrieved from memory module 602.

The processing module 601 is further arranged, under the program instructions, to control an optional Dynamic Threshold module 606, which extends the method explained.

Dynamic Threshold module 606 is arranged to adapt the current threshold values dynamically to the results of the detected SILENCE/TALK period status transfers over the last performed detections. Adaptation of the Threshold values may occur by reading the actual value from memory module 602 and incrementing or decrementing the value and storing the adapted value in memory module 602.

In a proper radio environment with only a few failure/re-transmissions and regular UL-grant scheduling, the threshold values are lowered by small decrements starting from the nominal predetermined values. In case the radio-conditions deteriorate, to be detected by the increasing number of failure/re-transmissions or the increasing number of UEs to be serviced, the threshold values are incremented in large steps towards the nominal values.

The Evaluation and Detection module 603, the Counter module 604, the Timer module, the Determination module 608 and the optional Dynamic Threshold module 606 are implemented as either hardware or a computer program executed by the processor module 601 with support of the memory module 602 and the interface module 607.

The method, system and device presented advantageously provide the possibility to detect whether the UE 101 is still in a TALK period status 200B or has transferred to a SILENCE period status.

Although the method is exemplified for a VoLTE communication system, any communication system, albeit wireline or wireless, deploying a TALK/SILENCE period status deploying Voice over Internet Protocol (VoIP) with Quality of Service (QoS) differentiation at the Media Access Control (MAC) layer benefit advantageously from the method as presented.

The method is not relying on packet size, neither only on interval timing between the transmissions from the device that needs to be evaluated on its TALK/SILENCE mode status. VoIP Packet sizes may differ due to changing AMR deployment, and regular SID packet interval may be disturbed by non-VoIP packets e.g. FTP, scheduling delays and segmentation.

The method advantageously does not require the BS to inspect the packets to detect a UE's SILENCE period status or SID period, and/or the BS is transparent to the payload on the bearer. The Voice Activity Detector (VAD) flag as referred to in 3GPP TS 26.093 chapter 4.1, indicates whether the UE is in a TALK or SILENCE state. However, this VAD-flag needs Packet Data Convergence Protocol (PDCP) de-encrypting and RoHC decompressing to reveal this flag by the BS, which inspection disadvantageously requires BS processing by passing information from higher layers to the MAC layer and hence causing delay towards the receiving end.

It is regarded relatively simple to check the LCID in the MAC subheader, thereby enabling a reliable determination whether a transmission is a VoIP frame, such that the timing becomes a reliable method. The counting of non_VoIP, padding or empty transmissions is an advantageous method in combination with the timing in that the link is operational.

By this improved method to have a reliable detection 416 whether the UE 101 is in the SILENCE period status 200A, the UE's battery operational time is extended due to a justified detection of the SILENCE period status and lowering transmission frequency by lowered UL-grant frequency.

By application of this improved method the user may perceive a good end-user experience in that packet delays, caused by inadvertent perception by the BS 102 of a UE's transfer to SILENCE period state is prevented.

What is claimed is:

1. A method of operation by a node in a cellular network, the method comprising:
   controlling allocation of uplink resources for a user equipment (UE), in dependence on whether the UE is determined by the node to be in a talk state or a silence state, with respect to a Voice-over-Internet-Protocol (VoIP) session; and
   detecting a transition by the UE from the talk state to the silence state based on the time elapsed since last receiving a VoIP transmission from the UE and the number of non-VoIP transmissions received from the UE during that time.

2. The method of claim 1, where any given uplink transmission from the UE constitutes a VoIP transmission if it is successfully received by the node, and is associated with a logical channel used for the VoIP session, and contains VoIP speech or VoIP Silence Interval Description (SID) information, and where any given uplink transmission from the UE that does not constitute a VoIP transmission constitutes a non-VoIP transmission.

3. The method of claim 1, wherein the last-received VoIP transmission and the non-VoIP transmissions received since the last-received VoIP transmission are sent by the UE in dependence on being allocated corresponding uplink resources by the node.

4. The method of claim 1, wherein controlling the allocation of periodic resources comprises allocating uplink resources more frequently when the UE is determined to be in the talk state, as compared to when the UE is determined to be in the silence state, or suspending the allocation of uplink resources for the UE, when the UE is determined to be in the silence state.

5. A node configured for operation in a cellular network, the node comprising:
   interface circuitry configured for communicating with a user equipment; and
   processing circuitry that is operatively associated with the interface circuitry and
   configured to:
      control allocation of uplink resources for a user equipment (UE), in dependence on whether the UE is determined by the node to be in a talk state or a silence state, with respect to a Voice-over-Internet-Protocol (VoIP) session; and
      detect a transition by the UE from the talk state to the silence state based on the time elapsed since last receiving a VoIP transmission from the UE and the number of non-VoIP transmissions received from the UE during that time.

6. The node of claim 5, where any given uplink transmission from the UE constitutes a VoIP transmission if it is successfully received by the node, and is associated with a logical channel used for the VoIP session, and contains VoIP speech or VoIP Silence Interval Description (SID) information, and where any given uplink transmission from the UE that does not constitute a VoIP transmission constitutes a non-VoIP transmission.

7. The node of claim 5, wherein the last-received VoIP transmission and the non-VoIP transmissions received since the last-received VoIP transmission are sent by the UE in dependence on being allocated corresponding uplink resources by the node.

8. The node of claim 5, wherein the processing circuitry is configured to control the allocation of periodic resources by allocating uplink resources more frequently when the UE is determined to be in the talk state, as compared to when the UE is determined to be in the silence state, or suspending the allocation of uplink resources for the UE, when the UE is determined to be in the silence state.

* * * * *